United States Patent
Lindberg

(10) Patent No.: US 7,500,453 B2
(45) Date of Patent: Mar. 10, 2009

(54) BOILER CONTROL UNIT

(76) Inventor: Karl-Erik Lindberg, Borgenhaug 19, Snaroya (NO) 1367

( * ) Notice: Subject to any disclaimer, the term of this patent is extended or adjusted under 35 U.S.C. 154(b) by 35 days.

(21) Appl. No.: 11/575,870

(22) PCT Filed: Sep. 8, 2005

(86) PCT No.: PCT/NO2005/000325

§ 371 (c)(1), (2), (4) Date: Mar. 23, 2007

(87) PCT Pub. No.: WO2006/036064

PCT Pub. Date: Apr. 6, 2006

(65) Prior Publication Data
US 2007/0215340 A1    Sep. 20, 2007

(30) Foreign Application Priority Data
Sep. 30, 2004 (GB) .................... 0421780.8

(51) Int. Cl.
    *H05B 1/02* (2006.01)
(52) U.S. Cl. ................. 122/14.2; 219/491; 219/492; 219/519
(58) Field of Classification Search ............... 122/14.2, 122/14.22; 219/491, 492, 494, 497, 509, 219/519
See application file for complete search history.

(56) References Cited

U.S. PATENT DOCUMENTS

| 4,819,587 | A * | 4/1989 | Tsutsui et al. ............ 122/448.1 |
| 4,850,310 | A | 7/1989 | Wildgen |
| 5,739,504 | A * | 4/1998 | Lyons et al. ................ 219/494 |
| 5,775,582 | A | 7/1998 | Hammer |
| 6,390,027 | B1 * | 5/2002 | Lyons et al. ............... 122/14.2 |
| 6,409,090 | B1 | 6/2002 | Gilvar et al. |
| 6,918,356 | B2 * | 7/2005 | Rowe et al. .............. 122/448.1 |
| 7,117,825 | B2 * | 10/2006 | Phillips ..................... 122/4 A |
| 7,249,573 | B2 * | 7/2007 | Kemp et al. ................. 122/504 |

FOREIGN PATENT DOCUMENTS

| DE | 10057942 | 6/2002 |
| EP | 0651873 | 11/1997 |
| GB | 2027949 | 2/1980 |
| GB | 2389891 | 12/2003 |
| WO | 94/02787 | 2/1994 |

* cited by examiner

*Primary Examiner*—Gregory A Wilson
(74) *Attorney, Agent, or Firm*—Christian Abel

(57) ABSTRACT

The invention relates to a boiler control unit (20) for controlling a burner (2) in a heating boiler (1) controlled by a thermal relay (6). The control unit (20) includes a delayed cycle controller (21) which overrides the thermal relay (6) control and thus delays the activating of the boiler. The delay is dynamically alterable by the controller, based on changes in the temperature of the boiler outlet temperature.

20 Claims, 4 Drawing Sheets

BOILER CONTROL UNIT

TECHNICAL FIELD

The invention relates in general to control of temperature controlled heating processes, in particular heating boilers. More specifically, the invention relates to an improved boiler control unit which includes a delayed cycle controller.

BACKGROUND OF THE INVENTION

Heating boilers for heating the rooms of a building and/or for providing tap hot-water are usually controlled by a thermal relay which provides an on/off temperature control. Such boilers are typically dimensioned in such a way that they are able to manage conditions, in which an extremely high heating demand exists, i.e. during the coldest winter days. This means that the capacity of the heating boiler is utilised to the greatest extent during the cold periods of the year. During the remaining parts of the year, the boilers are over-dimensioned, and consequently, the overall efficiency is not optimal.

RELATED BACKGROUND ART

A solution to the above problem is presented in EP-651 873, which discloses a delayed cycle control unit for a heating boiler equipped with an on-off controllable burner. The use of such a control unit results in an improved overall energy efficiency, particularly in periods with low loads, i.e. during moderate and warm seasons. The boiler is provided with a thermal relay, which provides a temperature responsive signal which is switched on when the temperature in the boiler underpasses a lower temperature level and switched off when the temperature in the boiler exceeds a higher temperature level. When the high temperature limit is reached, the burner is switched off, as also would be the case if the thermal relay controlled the burner directly. However, when the low temperature limit is reached, the burner is not switched on immediately, as would be the case if the thermal relay controlled the burner directly. Instead, the control unit is arranged to measure the cooling time of the boiler, by measuring the time that has elapsed between the on-to-off transition and the off-to-on transition of the signal provided by the thermal relay. The control unit is further arranged to add a certain percentage to this cooling time, resulting in a time delay, and to switch on the burner when this time delay has elapsed.

A control unit which operates according to the principles disclosed in EP-651 873 is available on the market under the brand "MicroTherm" (cf. www.energy-control-systems.no). The "MicroTherm" controller also includes an interface for connection of an external computer such as a notebook or hand-held computer. Certain configuration parameters, such as the cooling time delay percentage (denoted "E-factor"), may be set by means of a program executed by the external computer. Also, certain values may be output from the controller to the computer, such as the accumulated on-time of the burner.

Such prior art controllers provide an improved energy efficiency, compared to the traditional thermal relay control. The cooling time delay percentage or "E-factor" is however a static quantity, which must be preset by an operator. The selection of an appropriate "E-factor" has so far been based on experiments and experience.

SUMMARY OF THE INVENTION

An object of the present invention is to provide an improved delayed cycle controller for a heating boiler.

Another object of the invention is to provide such a boiler control unit which eliminates the need for a manual establishment and adjustment of the cooling time delay percentage ("E-factor").

Still another object of the invention is to provide such a control unit which provides improved energy efficiency during changing operating circumstances such as the varying load during season changes.

The above stated objects and further advantages are achieved with a boiler control unit as set forth in the accompanying set of claims.

BRIEF DESCRIPTION OF THE DRAWINGS

In the figures, identical elements are identified with the same reference numerals.

DETAILED DESCRIPTION OF THE INVENTION

Figure 1:
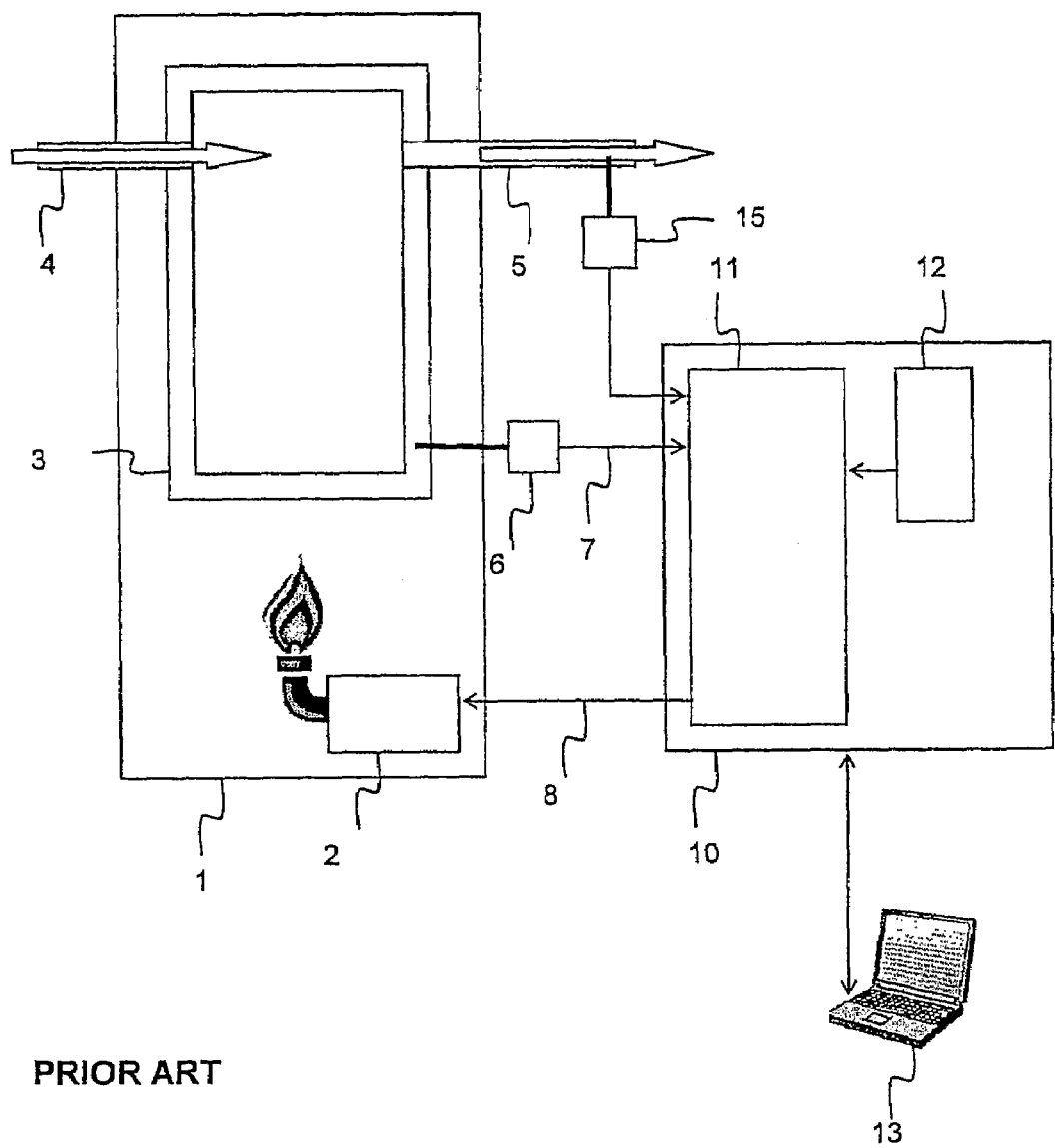
FIG. 1 is a schematic diagram illustrating a heating boiler controlled by a control unit according to prior art.

FIG. 1 is a schematic diagram illustrating a heating boiler 1 controlled by a control unit 10 according to the prior art, and more particularly the "MicroTherm" delayed cycle control unit mentioned above.

The boiler 1 comprises a water tank 3, an inlet conduit 4, an outlet conduit 5, and a burner 2 controlled in an on-off manner by a delayed cycle controller 11 in the control unit 10. A thermal relay 6 provides a temperature responsive signal 7 which is switched on when the temperature in the boiler underpasses a lower temperature level. The signal 7 is further switched off when the temperature in the boiler exceeds a higher temperature level.

The delayed cycle controller 11 is further arranged to produce a control signal 8 for input to the burner 2, in order to switch the burner 2 on and off as a function of the thermal relay signal and the time. More specifically, the control signal is switched off immediately when the thermal relay signal 7 is switched off, and the control signal is switched on at a delayed point of time after the thermal relay signal 7 is switched on. The delay is calculated by the controller 11 as a certain percentage of the boiler's cooling time, i.e. the time elapsed from the on-off transition to the off-on transition of the signal 7 provided by the thermal relay 6. The control unit 10 is further adapted to communicate with an external computer 13.

A temperature sensor 15 is arranged to measure the temperature of the tap hot water in the outlet 5 from the tank 3. The prior art controller 11 is arranged to compare the temperature measured with the temperature sensor 15 with a preset lower temperature level, and to start the burner if the measured temperature becomes lower than the lower temperature level.

The cooling time delay percentage or "E-factor", stored in the percentage register 12, is a fixed value, which may be preset by the external computer 13.

Figure 2:
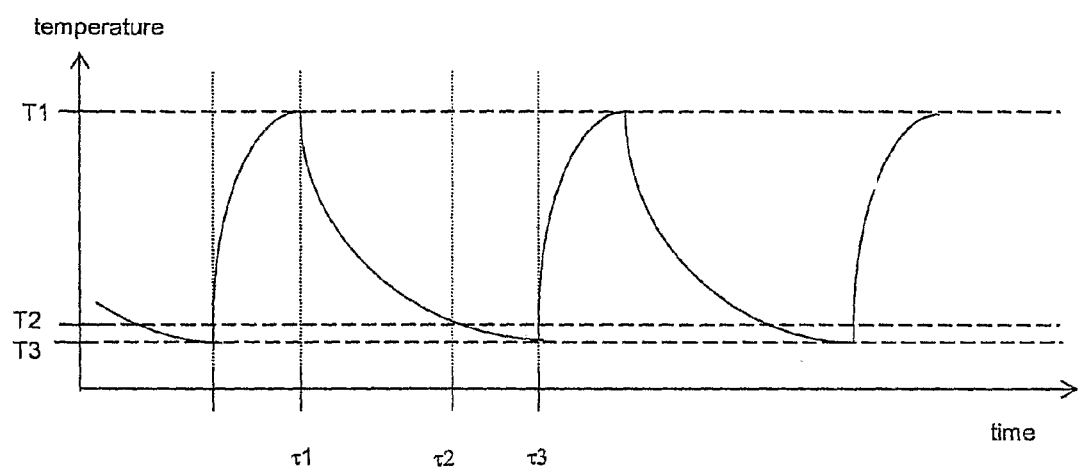
FIG. 2 is a graph illustrating the boiler temperature as a function of time.

FIG. 2 is a graph illustrating the boiler temperature as a function of time, in order to illustrate the operation of the delayed cycle controller.

At time τ1 the signal 7 provided by the thermal relay 6 is switched off, and the controller 11 switches off the burner 2.

The cooling time of the thermal relay is measured by the controller 11 as the period (τ2–τ1). At τ2, the signal 7 provided by the thermal relay 6 is switched on. The delayed cycle controller 11 will not start the burner immediately, at time τ2, but delay the start until the time τ3. The delay (τ3–τ2) is calculated by the controller 11 as the stored delay percentage of the measured cooling time (τ2–τ1).

Figure 3:
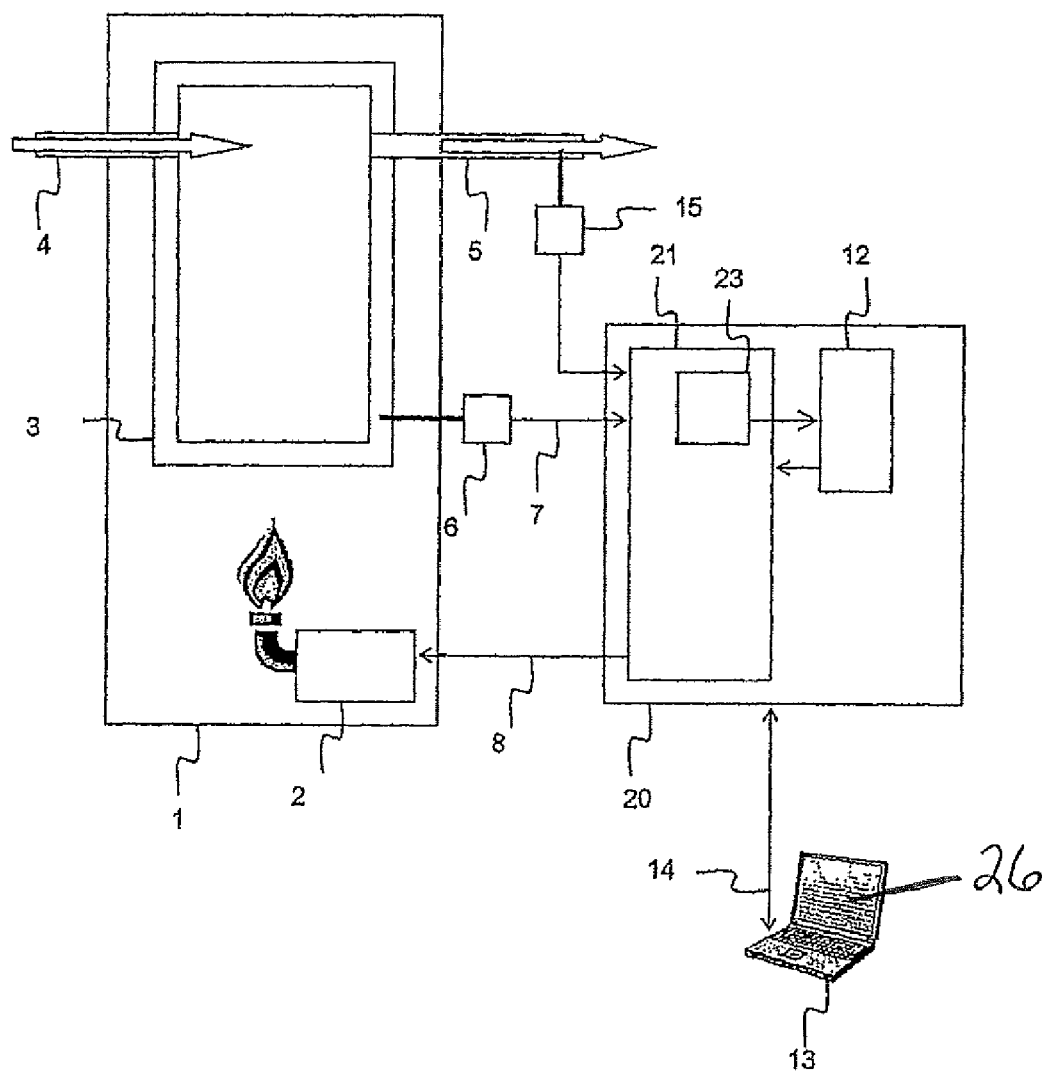
FIG. 3 is a schematic diagram illustrating a heating boiler controlled by a control unit according to the invention.

FIG. 3 is a schematic diagram illustrating a heating boiler controlled by a control unit 20 according to the invention.

A boiler 1 comprises an oil burner 2 and a water tank 3 containing water heated by the burner 2. The heating plant further comprises a hot-water conduit 5 which may be further connected to a number of taps (not shown) and/or a room heating system (not shown) provided with a shunt valve, circulation pump and radiators. The heating plant further comprises an incoming conduit 4 for supply of cold water as well as a chimney (not shown) for discharging fluid gases resulting from the combustion of oil.

The control unit 20 comprises an improved delayed cycle controller 21 and a time delay percentage register 12.

Similarly to the delayed cycle controller 11 of the prior art illustrated in FIG. 1, the improved delayed cycle controller 21 is arranged to input a temperature responsive signal 7 provided by a thermal relay 6 which is arranged to sense the temperature of the water present in the water tank 3. The thermal relay 6 causes the temperature responsive signal 7 to be switched on when the temperature in the boiler underpasses a lower temperature level and to be switched off when the temperature in the boiler exceeds a higher temperature level.

Further in correspondence with the prior art illustrated in DE 10057942, the delayed cycle controller 21 is arranged to perform a delayed cycle control function which is described in the following.

When the thermal relay signal 7 is switched off, the controller 21 deactivates the burner control signal 8, which leads to that the burner 2 is turned off. This occurs substantially immediately, such as within a couple of seconds, i.e. with no essential or intentional delay.

The delayed cycle controller 21 is further arranged to calculate the cooling time, i.e. the time (τ2–τ1) of the temperature decay from the high temperature level T2 to a low temperature level T2. This is performed by measuring the time elapsing between the on-to-off transition and the off-to-on transition of the signal 7 provided by the thermal relay.

The delayed cycle controller 21 is further arranged to read a percentage value from the time delay percentage register 12, and to calculate a time delay, which equals the cooling time multiplied by this percentage value.

When the water temperature indicated by the temperature signal 7 falls below the low temperature level, the signal provided by the thermal relay is switched on. This off-to-on transition of the thermal relay signal does not lead to that the burner is switched on immediately. Instead, the controller is arranged to switch on the burner when the calculated time delay has elapsed. In this way, an extension of the off-time of the heating boiler is obtained, which leads to a reduction in the total consumption of energy, i.e., oil, by the burner 2.

If the percentage value is set to zero, the delayed cycle controller will act as a conventional on-off controller, i.e. with the same function as if the thermal relay controlled the burner directly.

The temperature control unit 20 is further arranged to communicate with an external computer 13 via a communication connection 14. The communication connection 14 may be based on a wired connection, such as a serial communication, or a local, wireless connection such as an infrared or a radio based (e.g., Bluetooth) connection. Alternatively, the communication connection 14 may include a telecommunication network such as the public switched network or a cellular network. The percentage value may be set and/or read out by the external computer 13 via the interface 26.

A novel and distinct feature of the invention is the percentage value calculating module 23, which is a part of the improved delay cycle controller 21. The module 23 is arranged to change dynamically the delay time percentage value stored in the register 12, in accordance with changes in the temperature measured by the temperature sensor 15. The function of the percentage value calculating module 23 is further described with reference to FIG. 4 below.

In a preferred implementation, the delayed cycle controller 21, including the percentage value calculating module 23, is implemented as a software module, for execution by a microcontroller employed in the control unit 20. The time delay register 12 is a part of a memory connected to the microcontroller. The memory comprises a random access memory for variable data and a non-volatile memory containing fixed data and program instructions. The implementation of the program instructions is an ordinary task for a person skilled in the art, based on the description given in this specification.

Figure 4:
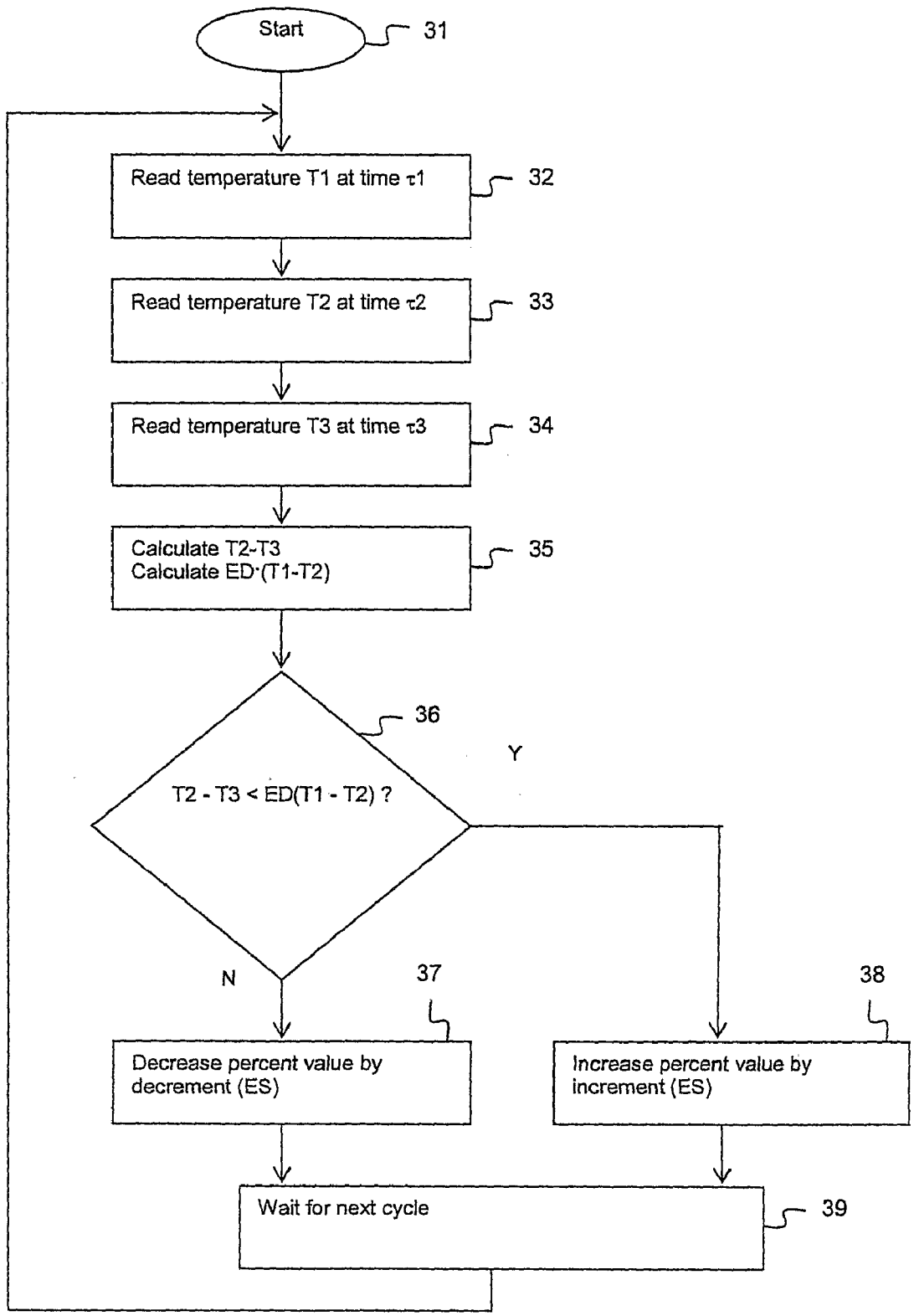
FIG. 4 is a flowchart illustrating a series of steps performed by the delayed cycle controller according to the invention.

FIG. 4 is a flowchart illustrating the process steps performed by the improved delayed cycle controller according to the invention.

The process starts at the initial step 31. In step 32, the temperature T1 at time τ1, i.e. when the thermal relay 6 is switched off, is measured and stored. Then, in step 33, initiated by the thermal relay 6 being switched on, i.e. at time τ2, the temperature T2 is measured and stored. Then the time τ3 is determined by calculating the cooling delay as (τ2–τ1) multiplied with the delay percentage stored in the register 12. At time τ3, in step 34, the temperature T3 is measured and stored. Next, the calculating step 35 is performed. The temperature difference T2–T3 is calculated, and so is the temperature difference (T1–T2) multiplied with a predetermined, stored constant ED, The value of ED is typically between 0.25 and 0.75. Most preferred, ED is about 0.50.

Then, in the decision step 36, the results of the preceding step 35 are compared. If T2–T3<ED·(T1–T2), step 38 is performed, wherein the percent value stored in the register 12 is increased by an increment value ES. Else, the percent value stored in the register 12 is decreased by a decrement value, typically identical to the increment value ES.

The increment value is typically between 2% and 10%, and most preferred about 5%.

In either case, the process continues at step 39, which brings the process control back to the initial step 31 for the processing of a next temperature cycle.

Although the heating device mention in the detailed description is an oil burner, the skilled person will also realize that the invention is applicable with other heating devices as well, e.g. an electrical heater or a gas heater.

Further variations and alternative embodiments will be evident to the person skilled in the art.

The invention claimed is:

1. Boiler control unit for controlling a heating device in a boiler, comprising a delayed cycle controller for activating and deactivating said heating device, wherein said delayed cycle controller is operated by a thermal relay, providing a temperature responsive signal which is switched on when the temperature in the boiler underpasses a lower temperature level and switched off when the temperature in the boiler exceeds a higher temperature level, and wherein said delayed cycle controller is arranged to determine the cooling time (□2−□1) of the boiler by measuring the time elapsing between the on-to-off transition (□1) and the off-to-on transition (□2) of the signal provided by the thermal relay, to determine a delay as a certain percentage of said cooling time (□2−□1), to deactivate the heating device essentially at the point of time when the thermal relay signal is switched off, and to activate the heating device at a point of time (□3) given by said delay after the off-to-on transition (□2) of the signal provided by the thermal relay, said boiler control unit further comprising an input of a signal from a temperature sensor which is arranged to measure the boiler outlet temperature, said percentage being dynamically variable, dependent on the signal from said temperature sensor.

2. Boiler control unit in accordance with claim 1, wherein said delayed cycle controller is arranged to measure
- a first temperature value (T1) from the temperature sensor at the point of time (□1) of the on-to-off transition of the signal provided by the thermal relay,
- a second temperature value (T2) at the point of time (□2) of the off-to-on transition of the signal provided by the thermal relay, and
- a third temperature value (T3) at the point of time (□3) given by said delay after the off-to-on transition (□2) of the signal provided by the thermal relay.

3. Boiler control unit in accordance with claim 2, wherein said percentage is dependent on the first (T1), second (T2) and third (T3) temperature values.

4. Boiler control unit in accordance with claim 3, wherein said delayed cycle controller is further arranged to increase said percentage by a predetermined increment value (ES) if the difference (T2−T3) between the second (T2) temperature value and the third (T3) temperature value is less than the difference (T1−T2) between the first (T1) temperature value and the second (T2) temperature value multiplied with a predetermined constant (ED).

5. Boiler control unit in accordance with claim 4, wherein said delayed cycle controller is further arranged to decrease said percentage by a predetermined decrement value (ES) if the difference (T2−T3) between the second (T2) temperature value and the third (T3) temperature value is equal to or greater than the difference (T1−T2) between the first (T1) temperature value and the second (T2) temperature value multiplied with a predetermined constant (ED).

6. Boiler control unit in accordance with claim 5, wherein said decrement value and said increment value are equal.

7. Boiler control unit in accordance with claim 6, further arranged to communicate with an external computer via a communication connection and an interface.

8. Boiler control unit in accordance with claim 7, wherein said increment (ES) is between 2% and 10%.

9. Boiler control unit in accordance with claim 8, wherein said increment (ES) may be set by means of the external computer.

10. Boiler control unit in accordance with claim 9, wherein said predetermined constant (ED) is between 0.25 and 0.75.

11. Boiler control unit in accordance with claim 10, wherein said predetermined constant (ED) may be set by means of the external computer.

12. Boiler control unit in accordance with claim 11, wherein said percentage is limited by a range of 30% to 600%.

13. Boiler control unit in accordance with claim 10, wherein said predetermined constant (ED) is about 0.50.

14. Boiler control unit in accordance with claim 13, wherein said predetermined constant (ED) may be set by means of the external computer.

15. Boiler control unit in accordance with claim 14, wherein said percentage is limited by a range of 30% to 600%.

16. Boiler control unit in accordance with claim 8, wherein said increment (ES) is about 5%.

17. Boiler control unit in accordance with claim 16, wherein said increment (ES) may be set by means of the external computer.

18. Boiler control unit in accordance with claim 17, wherein said predetermined constant (ED) is between 0.25 and 0.75.

19. Boiler control unit in accordance with claim 18, wherein said predetermined constant (ED) may be set by means of the external computer.

20. Boiler control unit in accordance with claim 19, wherein said percentage is limited by a range of 30% to 600%.

* * * * *